United States Patent [19]

Laub

[11] Patent Number: 5,471,887

[45] Date of Patent: Dec. 5, 1995

[54] REMOVABLE SENSOR ASSEMBLY

[75] Inventor: Michael F. Laub, Etters, Pa.

[73] Assignee: The Whitaker Corporation, Wilmington, Del.

[21] Appl. No.: 190,410

[22] Filed: Feb. 1, 1994

[51] Int. Cl.$^6$ .................................................. H01L 41/04
[52] U.S. Cl. ................................... 73/866.5; 310/355
[58] Field of Search ..................... 73/652, 654, 866.5; 439/79–82; 310/338, 329, 345, 354–356

[56] References Cited

U.S. PATENT DOCUMENTS

| | | | |
|---|---|---|---|
| 2,429,826 | 10/1947 | Kuenstler | 310/356 |
| 4,628,410 | 12/1986 | Goodman et al. | 361/413 |
| 4,629,266 | 12/1986 | Viselli | 339/17 LC |
| 4,682,829 | 7/1987 | Kunkle et al. | 439/83 |
| 4,693,528 | 9/1987 | Asick et al. | 439/83 |
| 4,802,860 | 2/1989 | Kikuta | 439/79 |
| 4,837,927 | 6/1989 | Savage, Jr. | 439/79 |
| 4,917,614 | 4/1990 | Kikuchi et al. | 439/83 |
| 4,955,820 | 9/1990 | Yamada et al. | 439/83 |
| 5,078,611 | 1/1992 | Tanigawa et al. | 439/78 |
| 5,098,311 | 3/1992 | Roath et al. | 439/289 |
| 5,127,839 | 7/1992 | Korsunsky et al. | 439/79 |
| 5,137,454 | 8/1992 | Baechtle | 439/62 |
| 5,145,384 | 9/1992 | Asakawa et al. | 439/78 |
| 5,145,386 | 9/1992 | Berg et al. | 439/83 |
| 5,156,552 | 10/1992 | Zaderej et al. | 439/59 |
| 5,161,985 | 11/1992 | Ramsey | 439/74 |
| 5,184,963 | 2/1993 | Ishikawa | 439/79 |
| 5,188,535 | 2/1993 | Bertho et al. | 439/83 |
| 5,199,885 | 4/1993 | Korsunsky et al. | 439/79 |
| 5,201,664 | 4/1993 | Korsunsky et al. | 439/83 |
| 5,213,515 | 5/1993 | Ishikawa et al. | 439/79 |
| 5,224,866 | 7/1993 | Nakamura et al. | 439/81 |

*Primary Examiner*—Robert Raevis
*Attorney, Agent, or Firm*—June B. Schuette

[57] ABSTRACT

A removable sensor assembly (10) comprises a removable sensor member (15) to be inserted into the opening (27) of an insulated housing (13) mounted on the surface of a PCB (11) and secured thereon by a pair of the contact members (16, 17). The contact members (16, 17) have respective foot portions (19, 20) which are soldered to contact pads (14) on the PCB (11). The removable sensor member (15) is a piezoelectric film sensor mounted onto a hard drive to detect physical shock and to shut the drive down in order to prevent destruction of data thereon. The opening (27) is a slot angled at 45° to the surface of the PCB (11) to allow a three-axis sensing capability as well as reducing the overall height of the insulated housing (13). Each of the contact members (16, 17) includes a contact portion (33), a foot portion (19, 20), a reaction member (34), and a beam member (36), thereby providing a reliable physical and electrical contact between the removable sensor member (15) and the PCB (11) as well as minimizing unwanted forces translated to the foot soldered joint during insertion and removal of the removable sensor member (15). Upon being inserted into the opening (27), the removable sensor member (15) is retained therein by a retention clip (55).

13 Claims, 5 Drawing Sheets

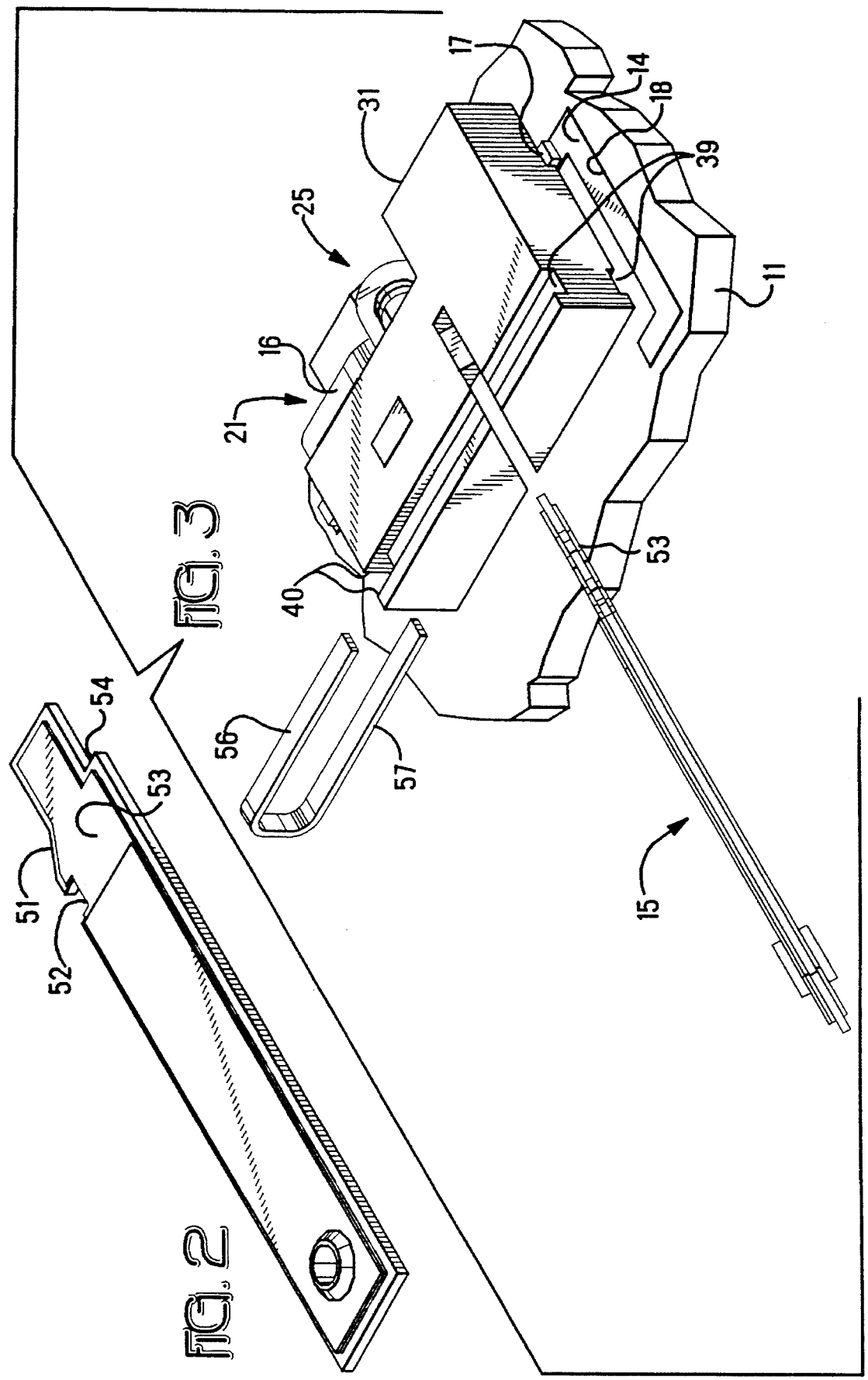

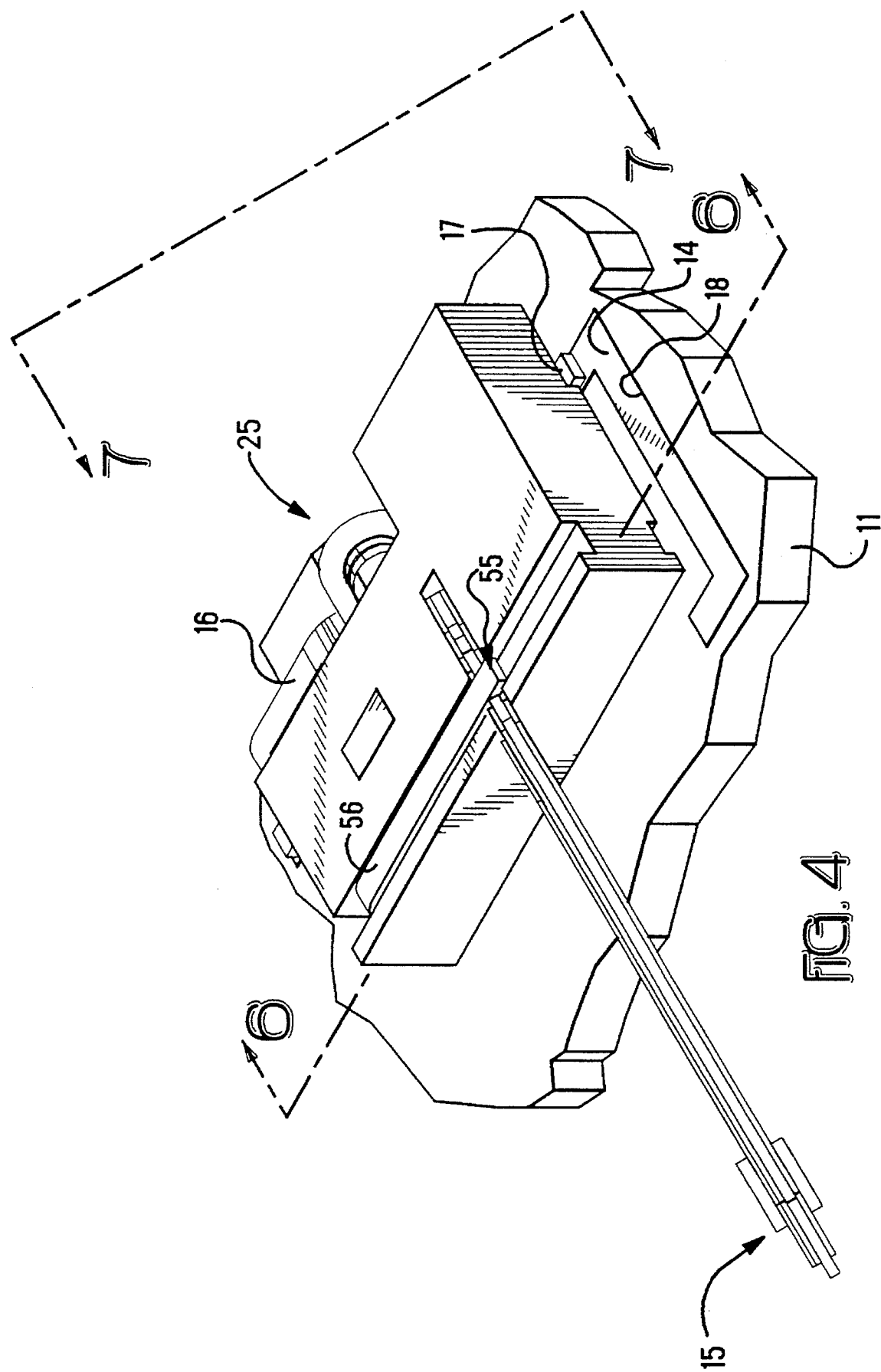

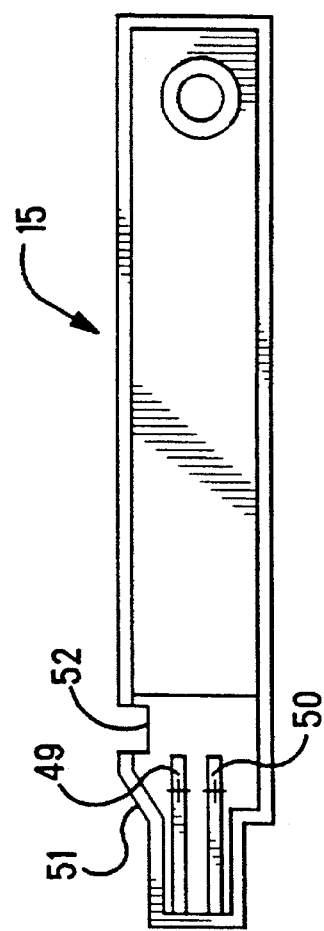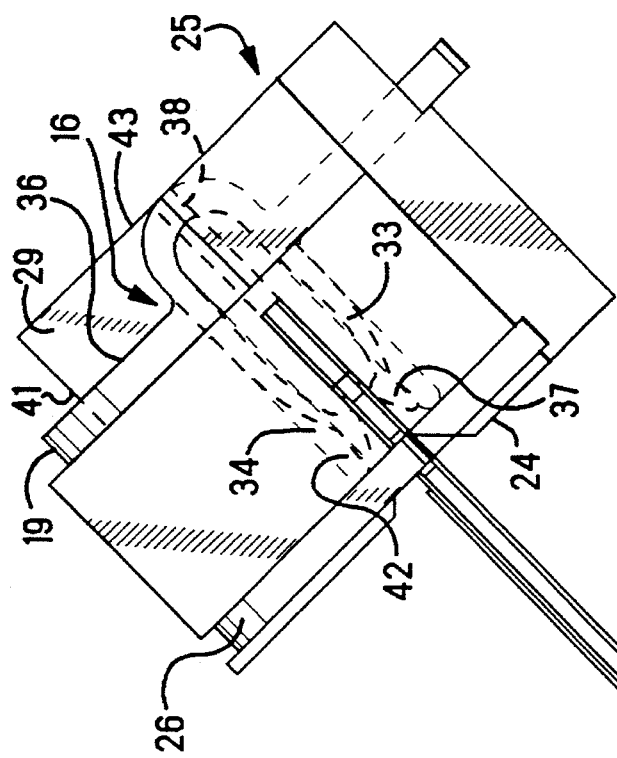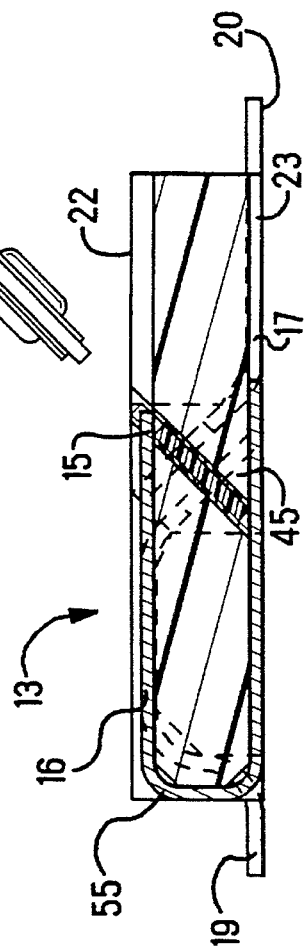

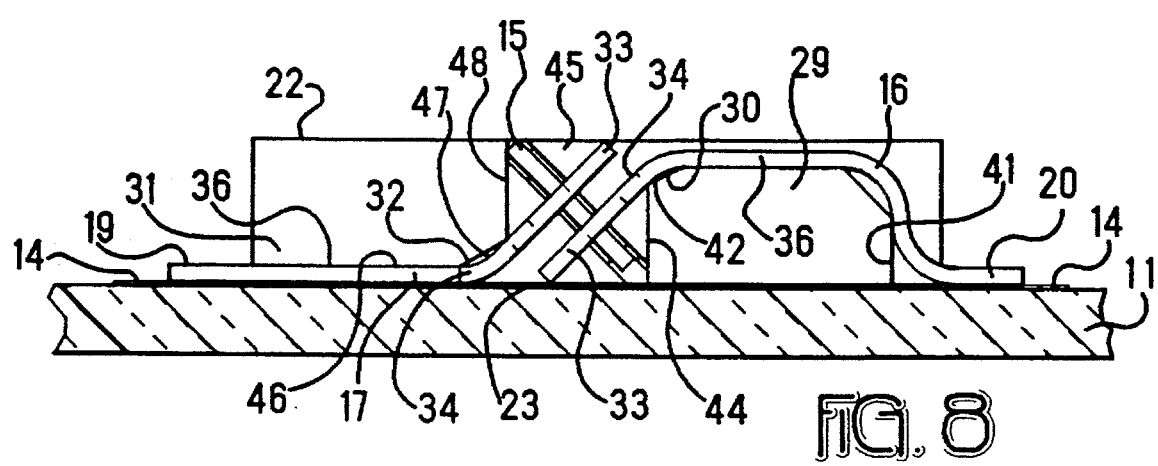

REMOVABLE SENSOR ASSEMBLY

FIELD OF THE INVENTION

The present invention relates to sensors which are intended to be mounted on the surface of a printed circuit board ("PCB"), and more particularly, to removable piezoelectric sensors which are secured on the surface of the PCB by means of a suitable electrical connector.

BACKGROUND OF THE INVENTION

Personal computers ("PC's") including laptop and notebook computers and digital assistants, are becoming compact and miniaturized for convenient portability. As a result, the PC's are ;subjected to physical shock and bumps during normal use and operation. Due to the potential of corrupting data stored or else entering incorrect data, the PC's hard drive is the most vulnerable area of the computer; hence requires protection. To provide protection in the event that a physical shock is incurred, the PC's have physical shock sensors associated with the hard drives. When the sensor detects a shock, the hard drive is shut down to prevent destruction of data on the disk and damage to the read/write heads. One type of miniature reliable sensor, especially advantageous for the next generation of PC's, is a piezoelectric film sensor manufactured and sold by AMP, Inc.

One problem, however, is that the piezoelectric film sensors (being of a laminated structure) have a relatively low melting point; thus these sensors cannot withstand solder reflow temperatures normally encountered in the process of soldering these sensors to the PCB's. To overcome this problem, these peizoelectric film sensors are assembled into large plastic housings to provide thermal protection during the reflow solder process. However, the large plastic housings containing these piezoelectric film sensors cannot be used with the new smaller hard drives. Where the application dictates the use of the sensor without the large plastic housing, the film sensor is hand-soldered to the PCB after the reflow process; however, this is costly and time consuming.

Therefore, it would be highly desirable to provide a piezoelectric film sensor on the surface of a PCB, wherein the sensor is not subjected to the heat associated with reflow soldering.

Surface-mount technology for other devices or components is widely acceptable in the industry. The components are mounted and soldered directly to a surface of a PCB; and it is not necessary for the components to penetrate the PCB, thus eliminating the pre-drilled holes through the PCB. U.S. Pat. Nos. 5,145,384, 5,145,386, and 5,188,535, assigned to Molex Inc., U.S. Pat. Nos. 4,693,528, 4,955,820, 5,137,454 and 5,213,515, assigned to AMP Incorporated (the assignor of the present invention), and many others, while not in association with sensors, describe surface-mounted connectors which comprise an insulated housing having a plurality of contact receiving apertures and closely spaced contacts each mounted in respective contact-receiving apertures. The contacts engage respective contacts in the connector, and a surface-mounted soldering section is mounted on the surface of the PCB and is electrically connected to a defined conductor track or pad on the PCB. An electrical article (including another PCB, an electric component, or another connector) is inserted into the connector and is secured therein in electrical contact with the PCB.

Disadvantageously, the soldering joint is subjected to undesired exterior forces which are applied to the joint through the contact from the contacting section during insertion and removal of the electrical article. Sometimes, the force can cause the soldering section to be removed from the PCB, thus failing to provide reliable electrical contact with the PCB and repetitive product failure.

The above-described weakness of conventional surface-mounted connectors, and the risk of damage of solder joints, presents a reliability and quality assurance problem and associated warranty costs incurred by the manufacturer.

Therefore, efforts are constantly being made to design improved contact shapes to enhance the connection of electrical articles to PCBs. For instance, U.S. Pat. No. 4,455,820 describes an improved soldering portion which is capable of preventing localized concentration of forces in the soldering portion; the structure includes a large foot and a leg which, together, are shaped in the form of an inverted "T". This soldering portion minimizes the load per unit soldering area upon application of undesired external forces to the soldering joint.

In U.S. Pat. No. 5,145,384, the contacts include an inverted U-shaped portion defining a pair of depending legs; one of the legs has a foot portion for attachment to an appropriate circuit trace of the PCB. This provides some degree of yielding or flexibility in the contact, as well as between the electrical article and the PCB to relieve stresses at the soldering connections.

SUMMARY OF THE INVENTION

In an attempt to overcome disadvantages of the prior art, the present inventor (first in the field) proposed the concept of a removable piezoelectric sensor, which is secured on the surface of the PCB. This connector is first run through the reflow process. Thereafter, the sensor is easily inserted into the connector. Thus, the electrical contact between the sensor and the PCB is fulfilled, and the sensor is not subjected to the heat associated with the soldering reflow process.

It is, therefore, an object of the present invention to provide a removable sensor assembly, wherein the sensor is not subjected to the heat associated with a reflow solder process. It is another object of the present invention to provide a piezoelectric film sensor which can be easily inserted and removed and also be securely mounted on this assembly.

It is a further object of the present invention to provide a surface-mounted connector which provides a reliable contact of the piezoelectric film sensor to the PCB.

It is another object of the present invention to provide an improved contact member which minimizes stresses applied to the solder joint.

It is also another object of the present invention to provide a miniature connector to meet the smaller package requirements of the new generation of personal computers.

According to the present invention, a removable sensor assembly is mounted on the surface of a printed circuit board ("PCB") having a connector receiving area and first and second contact pads. The removable sensor assembly includes a removable sensor member, a connector including an insulated housing having an opening for receiving the removable sensor member, and at least a pair of contact members. The removable sensor member has first and second contact elements intended to electrically engage respective first and second contact pads on the surface of the PCB. Each of the contact members includes a contact portion resiliently engaging the first and second contact elements of the removable sensor member, respectively, within the insulated housing, and a foot portion engaging the first and second contact pads on the PCB, respectively. The foot portion of each of the contact members comprises a solder foot which is soldered to one of the contact pads on the PCB. Each of the contact members also includes a reaction member in the form of a straight beam joined to the respective contact portion for providing a reaction surface for the mechanical forces translated from the contact portion to the foot portion, and a beam member connects the foot portion to the joint between the contact portion and the reaction member.

The removable sensor member is a piezoelectric film sensor to be mounted onto a hard drive to detect shock to the hard drive and to shut it down in order to prevent destruction of data thereon. The removable sensor member is received within the opening of the insulated housing and is retained therein after both solder feet are soldered to the contact pads on the PCB; and a removable sensor member is retained in the insulated housing by a retention clip.

The opening in the insulated housing is a slot angled at 45 degrees with respect to the surface of the PCB to allow three axis sensing capability as well as reducing the overall height of the housing.

These and other objects of the present invention will become apparent from a reading of the following specification taken in conjunction with the enclosed drawings.

BRIEF DESCRIPTION OF THE DRAWINGS

FIG. 2 is a schematic view of the removable sensor member.

FIG. 3 is an exploded perspective view of the removable sensor assembly showing the connector soldered to the PCB.

FIG. 4 is a perspective view of the completely assembled removable sensor assembly.

FIG. 5 is a side elevation view of the removable sensor member, drawn to an enlarged scale.

FIG. 6 is a sectional view, taken along lines 6—6 of FIG. 4, and drawn to an enlarged scale.

FIG. 7 is a further sectional view, taken along lines 7—7.

FIG. 8 is a rear view of the removable sensor assembly.

FIG. 9 is a side elevation view of the removable sensor member with the housing in cross section.

DETAILED DESCRIPTION OF THE INVENTION

Figure 1:
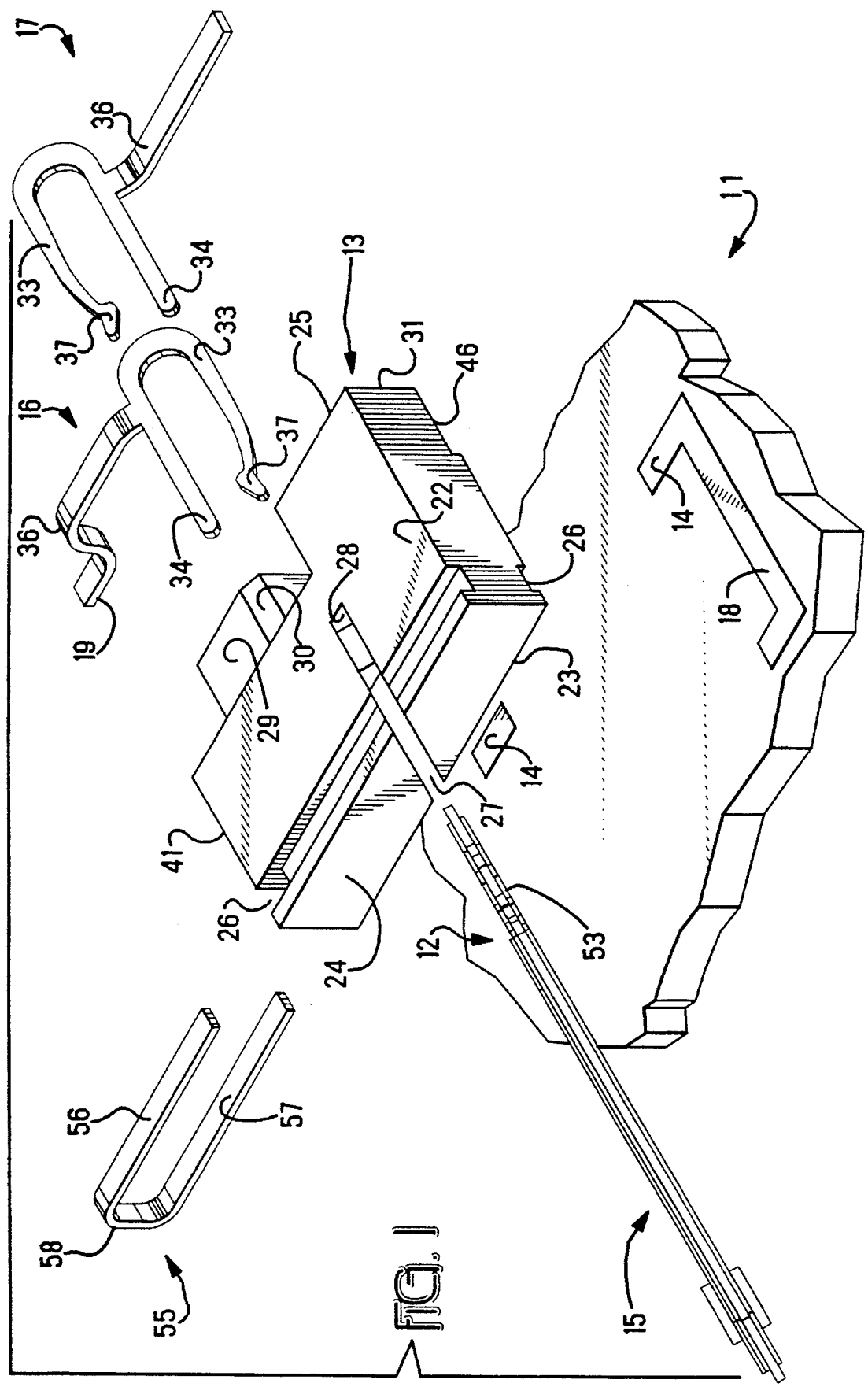
FIG. 1 is an exploded perspective view of a removable sensor assembly on a printed circuit board in accordance with one embodiment of the present invention, the removable sensor member preferably being angled at approximately 45° to the surface of the PCB.

With reference to FIGS. 1, 3 and 4, a removable sensor assembly 10 is disposed on a PCB 11 (such as a PCB used in a hard drive of a computer) and the PCB 11 has a top surface including a connector receiving area 12 to accommodate an insulated housing 13 and a plurality of contact pads 14. The contact pads 14, which are made of a suitable conductive material, provide electrical contact between the PCB and a removable sensor member 15 through contact members 16 and 17, respectively. The contact pads 14 engage circuit traces on the PCB, one of which is shown at 18 in FIG. 1, and the contact pads 14 also provide the mechanical support between the PCB 11 and foot portions 19 and 20 of contact members 16, 17, respectively.

A surface-mounted connector 21 is disposed on the PCB 11 and includes thereon insulated housing 13 in which the pair of the contact members 16, 17 are housed. The insulated housing 13 is a molded plastic housing (for example) having an upper and bottom substantially planar surfaces 22 and 23, respectively, of substantially rectangular form. The bottom surface 23, being in direct contact with the surface of the PCB 11 within the connector receiving area 12, provides a reliable physical contact therebetween. The housing 13 also includes a front end 24 and a rear end 25. Each of the upper and bottom surfaces 22 and 23 has a well 26 extended parallel to the front end 24. The wells 26 on the upper surface 22 and on the bottom surface 23 are symmetrical to each other. The front end 24 has a slot 27 which is extended through the housing 13, thereby forming openings on the upper and bottom surfaces until the end 28 of the slot 27. The slot 27 is angled at 45° to the bottom surface 23 of the housing 13. A rear end 25 of the housing 13 (as shown in FIG. 8) includes a shoulder 29 having an inclined portion 30. The height of the shoulder 29 is less than the height of the housing 13. The rear end 25 of the housing 13 also includes a shoulder 31 which is similar to the shoulder 29, but is inverted. The shoulder 31 has an inclined portion 32. The housing 13 has a cavity 45 to accommodate reaction members 34 and the contact portions 33 of the contact members 16 and 17. Each contact member 16, 17 includes a contact portion 33, a reaction member 34, a foot portion 19 (or 20), and a beam member 36. The contact members 16, 17 make electrical contact between the removable sensor member 15 and the PCB 11. The contact members 16, 17 are stamped and formed from metal strip stock, and are connected to the PCB 11 by standard automated techniques. The contact portions 33 serve for resiliently engaging the removable sensor member 15. The foot portions 19, 20 engage the contact pads 14. Each foot portion 19, 20 is a solder foot and is soldered to one of the contact pads 14. The reaction member 34 is in the form of a straight beam and provides a reactive surface for the mechanical forces translated from the respective contact portions 33 to the foot portions 19, 20 during insertion and removal of the sensor 15. Each contact portion 33 includes first and second ends, such that the first end comprises an angled lead-in 37 to be engaged in the removable sensor member 15, and the second end is connected to the reaction member 34 to form a contact/reaction joint 38. The beam member 36 connects the contact/reaction joint 38 to the foot portion 19 (or 20). The contact/reaction joint 38 minimizes the translation of forces present during insertion of the sensor member 15 to the solder joint at the foot portion 19. The beam member 36 is designed to be long enough and to have enough compliance such that the forces that translate from the contact/reaction joint 38 are to be further absorbed in the beam 36. This further reduces stresses exerted upon the solder joint.

The contact members 16, 17 are inserted and anchored in the housing 13 as shown in FIGS. 3–8. The contact member 16 is placed on the shoulder 29 such that the reaction member 34 lays on the inclined portion 30, and the beam member 36 lays on the upper surface of the shoulder 29. One end of the beam member 36 is connected to the reaction member 34 (in place of the contact/reaction joint 38). Another end of the beam member 36 is connected to the foot portion 19, forming the beam/foot joint to cover the side wall 41 of the shoulder 29. The beam/foot joint, beam member 36 and reaction member 34, being successively connected, form a resilient arch which embraces the surface of the shoulder 29 including the inclined portion 30, upper surface of the shoulder 29, and side wall 41. The inclined portion 30 extends into the housing 13 to form the cavity 42 adjacent to an inner side wall 44 to accommodate and anchor the reaction member 34. Thus, the reaction member 34 also provides the additional function of retaining the contact member 16 in resilient contact with the insulated housing 13. The contact/reaction member 38 covers partially the rear edge 43 of the inclined portion 30 and partially the inner side wall 44 of the shoulder 29.

The contact portion 33 is accommodated in the cavity 45 to provide contact with the removable sensor member 15 such that the removable sensor member 15 is retained between the reaction member 34 and the contact portion 33, and in direct contact with the angled lead-in 37.

The contact member 17 has a beam member 36 laying beneath the bottom surface 46 of the shoulder 31. The reaction member 34 of the contact member 17 lays on the inclined portion 32 which extends into the housing 13 to form the cavity 47 (similar to the cavity 42) adjacent to the inner side wall 48. The contact portion 33 of the contact member 17 is accommodated in the cavity 45 to provide the resilient contact with the removable sensor member 15, such that the removable sensor member 15 is retained between the reaction member 34 and the contact portion 33 is in direct contact with the angled lead-in 37.

When the foot portions 19, 20 of the respective contact members 16, 17 are soldered to the contact pads 14 (by a standard automated reflow soldering process) the contact members 16 and 17, respectively, being placed as described above, secure the insulated housing 13 on the PCB 11.

After the soldering process is accomplished, the housing is secured on the PCB, and the contact members 16, 17 are mounted to allow the contact portions 34 to provide electrical contact with the removable sensor member 15. The removable sensor member 15 is inserted into the slot 27. The removable sensor member 15 is a piezoelectric film sensor which is mounted on the PCB 11 in order to detect a physical shock and to shut down the hard drive in order to protect data secured therein and to prevent inputting incorrect data into the drive.

Since the sensor member 15 is removable and is inserted into the connector only after the soldering process is accomplished, it is not subjected to heat associated with the reflow soldering, and thus does not require any additional protection. FIGS. 1–3 show the removable sensor member 15 before insertion into the housing 13, and FIG. 4 shows the removable sensor member 15 in the housing 13. In such an arrangement, the removable sensor assembly 10 is used in a hard drive. The sensor member is inserted into the insulated housing 13 at a 45 degree to the surface of the PCB 11. This allows a three-axis sensing capability as well as reduces the overall height of the connector. As is shown in FIGS. 2, 5, 9, the sensor member 15 includes a contact section 53, including two contact elements 49, 50 intended to electrically engage the contact pads 14 through the contact members 16, 17, such that the lead-in 37 of the contact member 16 makes contact with the contact element 50 on one side of the sensor member 15, and the lead-in 37 of the contact member 17 makes contact with the contact element 49 on the other side of the sensor member 15. The angled lead-ins 37 permit the sensor member 15 to pass over the contact elements 49, 50, spreading it for entry into the slot 27. The sensor member 15 has an angled lead-in 51 and a well 52. As the sensor member 15 enters the slot 27, an enlarged section 54 provided a physical stop (FIG. 9) to prevent further ingress of the sensor member 15. At the final insertion depth (at the end 28 of the slot 27) the sensor member 15 is locked into place by a retention clip 55. The retention clip 55 includes upper and bottom beam members 56, 57 connected to each other on one end to form bight portion 58, the length of which is equal to the shortest distance between the bottoms 39 of the wells 26 in slots on the respective upper and bottom surfaces 22, 23 of the insulated housing 13. The retention clip 55 embraces the housing 13 such that the upper beam member 56 is inserted into the well 26 on the upper surface 22, and the bottom beam member 57 is inserted into the well 26 on the bottom surface 23 of the housing 13. The upper beam member 56 and the bottom beam member 57 are retained in the wells 26 by two side walls 40 of the wells 26. The upper beam member 56 also springs back into the well 52 of the sensor member 15 to removably retain the piezoelectric film sensor. The lead-in 51 presses the retention clip 55 apart. The slot 27 is sufficiently dimensioned to resist rotation of the sensor member 15 about its longitudinal axis.

Obviously, many modifications may be made without departing from the basic spirit of the present invention. The invention is herein described with particular reference to a removable piezoelectric sensor assembly, however, the principles of the invention are applicable to other devices to be mounted on a PCB. Accordingly, it will be appreciated by those skilled in the art that within the scope of the appended claims, the invention may be practiced other than has been specifically described herein.

I claim:

1. A removable sensor assembly for mounting onto a substrate comprising:

a. a flat removable sensor member having first and second contact elements located on opposite sides of said sensor member, b. an insulated housing having an opening for receiving said removable sensor member, such that said first and second contact elements of said removable sensor member are disposed within said insulated housing, c. at least two contact members, wherein each of said contact members has a contact portion resiliently engaging a respective one of said first and second contact elements, and further wherein each of said contact members has a foot portion engaging the substrate, said foot portions extending laterally from the insulated housing.

2. The removable sensor assembly of claim 1, wherein said opening is a slot angled at 45 degrees with respect to the substrate.

3. The removable sensor assembly of claim 1, wherein each Of said contact members further includes a reaction member comprising a straight beam joined to the contact portion, wherein the insulated housing provides a respective cavity, and wherein the straight beam of the reaction member is received and anchored within said respective cavity, thereby providing a stabilization reaction to mechanical forces on said contact portion and minimizing mechanical forces translated from the contact portion to said foot portion.

4. The removable sensor assembly of claim 3, wherein said contact portion including first and second ends, said first end comprising an angled lead-in engaging one of said contact elements, said second end of said contact portion being connected to the reaction member, thereby forming a contact/reaction joint, said contact portion being substantially parallel and spaced-apart from the straight beam of the reaction member, between said first end and the contact/ reaction joint, and said removable sensor member being retained between the reaction member and the contact portion of each of said two contact members.

5. The removable sensor assembly of claim 3, wherein said contact member further includes a beam member connecting the contact/reaction joint to said foot portion of said contact member, said beam member extending substantially perpendicular to said reaction member.

6. The removable sensor assembly of claim 3, wherein the lead-in is sufficiently angled to permit the sensor surface to pass over said contact element spreading in said insulated housing.

7. The removable sensor assembly of claim 1, further comprising a retention clip removably interfering with egress of said removable sensor member relative said insulated housing, the retention clip embracing the insulated housing outwardly.

8. A removable sensor assembly mounted onto a substrate comprising:
   a. a printed circuit board having a mounting surface and first and second contact pads,
   b. a removable sensor member having first and second contact elements,
   c. an insulated housing mounted on said printed circuit board, said insulated housing having an opening for receiving said removable sensor member, such that said first and second contact elements of said removable sensor member are disposed within said insulated housing,
   d. at least two contact members, wherein each of said contact members has a contact portion resiliently engaging a respective one of said first and second contact elements, and further wherein each of said contact members has a foot portion engaging respective contact pads wherein said opening is a slot angled at 45 degrees with respect to the substrate.

9. The sensor assembly of claim 8, wherein each of said contact members further includes a reaction member comprising a straight beam joined to the contact portion, wherein the insulated housing provides a respective cavity, and wherein the straight beam of the reaction member is received and anchored within said respective cavity.

10. The removable sensor assembly of claim 9, wherein said contact portion includes first and second ends, wherein said first end comprises an angled lead-in engaging one of said contact elements, and further wherein said second end of said contact portion is connected to the reaction member, thereby forming a contact/reaction joint.

11. The removable sensor assembly of claim 10, wherein the lead-in is sufficiently angled to permit the sensor surface to pass over said contact element spreading said contact element for entry into said opening in said insulated housing.

12. The removable sensor member assembly of claim 10, wherein said contact member further includes a beam member connecting the contact/reaction joint to said foot portion of said contact member.

13. The removable sensor member assembly of claim 8, further comprising a retention clip interfering with egress of said removable sensor member relative said insulated housing.

* * * * *